United States Patent
Dugan et al.

(10) Patent No.: US 7,472,209 B2
(45) Date of Patent: Dec. 30, 2008

(54) METHOD FOR NON-DISRUPTIVELY UNASSIGNING AN ACTIVE ADDRESS IN A FABRIC

(75) Inventors: Robert J. Dugan, Hyde Park, NY (US); Giles R. Frazier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 11/452,833

(22) Filed: Jun. 13, 2006

(65) Prior Publication Data

US 2006/0253630 A1  Nov. 9, 2006

Related U.S. Application Data

(62) Division of application No. 10/043,489, filed on Jan. 11, 2002, now Pat. No. 7,085,860.

(51) Int. Cl.
*G06F 3/00* (2006.01)

(52) U.S. Cl. ................... 710/36; 710/5; 710/19

(58) Field of Classification Search ........... 710/5, 710/19, 36
See application file for complete search history.

(56) References Cited

U.S. PATENT DOCUMENTS

| | | | |
|---|---|---|---|
| 5,276,813 A | 1/1994 | Elliott et al. | 395/275 |
| 5,420,988 A | 5/1995 | Eliott | 395/275 |
| 5,467,344 A | 11/1995 | Solomon et al. | 370/396 |
| 5,522,046 A | 5/1996 | McMillen et al. | 709/239 |
| 5,564,040 A | 10/1996 | Kubala | 711/173 |
| 5,684,800 A | 11/1997 | Dobbins et al. | 370/401 |
| 5,734,652 A | 3/1998 | Kwok | 370/395 |
| 5,884,017 A | 3/1999 | Fee | 395/182.02 |
| 5,917,805 A | 6/1999 | Manning et al. | 370/236 |
| 6,009,103 A | 12/1999 | Woundy | |
| 6,035,414 A | 3/2000 | Okazawa et al. | 714/7 |
| 6,046,989 A | 4/2000 | Takahashi | 370/312 |
| 6,084,859 A | 7/2000 | Ratcliff et al. | 370/252 |
| 6,084,876 A | 7/2000 | Kwok et al. | 370/379 |
| 6,131,169 A | 10/2000 | Okazawa et al. | 714/7 |
| 6,138,161 A | 10/2000 | Reynolds et al. | 709/227 |
| 6,148,004 A | 11/2000 | Nelson et al. | 370/463 |
| 6,195,689 B1 | 2/2001 | Bahlmann | |
| 6,195,703 B1 | 2/2001 | Blumenau et al. | 709/238 |
| 6,327,621 B1 | 12/2001 | Lee et al. | 709/227 |

(Continued)

FOREIGN PATENT DOCUMENTS

DE  1000123 A1  12/2000

(Continued)

OTHER PUBLICATIONS

IBM Technical Disclosure Bulletin, "Physical Address Registers for a Fibre Channel Protocol Chip", G. M. Nordstrom, vol. 37, No. 10, Oct. 1994, pp. 607-608.

*Primary Examiner*—Alford Kindred
*Assistant Examiner*—David E Martinez
(74) *Attorney, Agent, or Firm*—Arthur Ortega

(57) ABSTRACT

A non-disruptive unassignment of an address from a fabric responsive to a request from a channel adapter. A logout command requests the fabric to unassign an address. The status of the address is thereby changed from active to unassigned and an acknowledgment sent back to the channel adapter.

2 Claims, 5 Drawing Sheets

U.S. PATENT DOCUMENTS

| | | |
|---|---|---|
| 6,778,540 B1 | 8/2004 | Ratcliff et al. |
| 6,807,579 B1 | 10/2004 | Frazier ........................ 709/245 |
| 6,910,108 B2 | 6/2005 | Downer et al. .............. 711/141 |
| 6,957,276 B1 | 10/2005 | Bahl |
| 7,127,524 B1* | 10/2006 | Renda et al. ................. 709/245 |
| 2002/0091786 A1 | 7/2002 | Yamaguchi et al. ......... 709/213 |
| 2002/0129285 A1* | 9/2002 | Kuwata et al. .............. 713/202 |
| 2002/0161887 A1* | 10/2002 | Foster et al. ................. 709/225 |
| 2003/0217154 A1 | 11/2003 | Kasper ........................ 709/227 |

FOREIGN PATENT DOCUMENTS

| | | |
|---|---|---|
| EP | 0858199 A2 | 8/1998 |
| WO | WO0017769 A1 | 3/2001 |

* cited by examiner

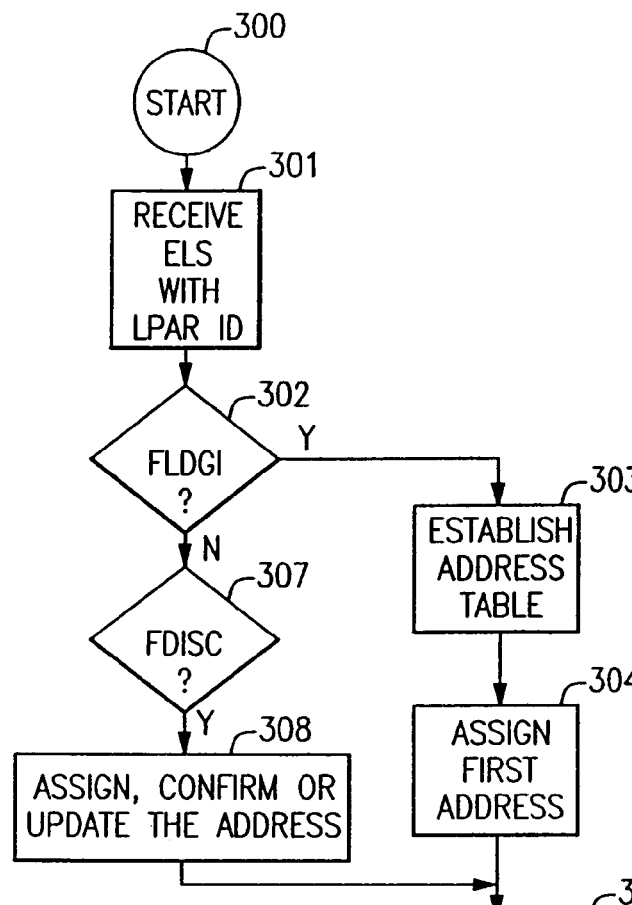
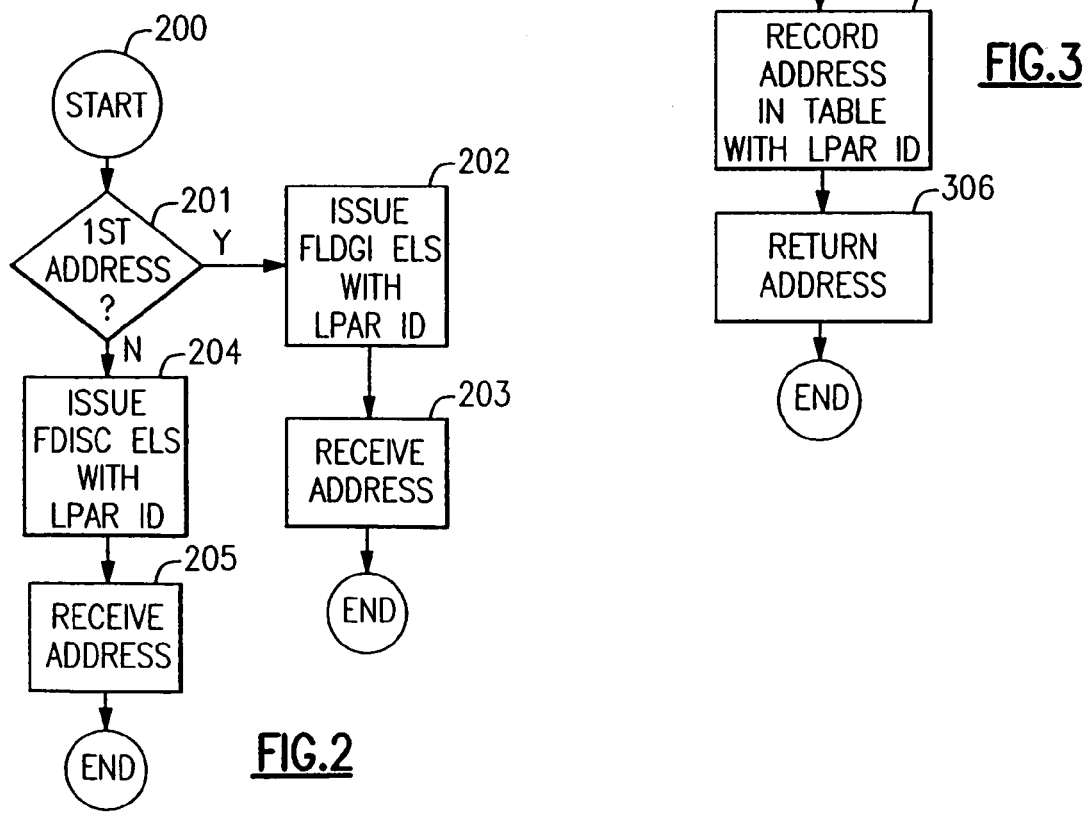
FIG.3
FIG.2

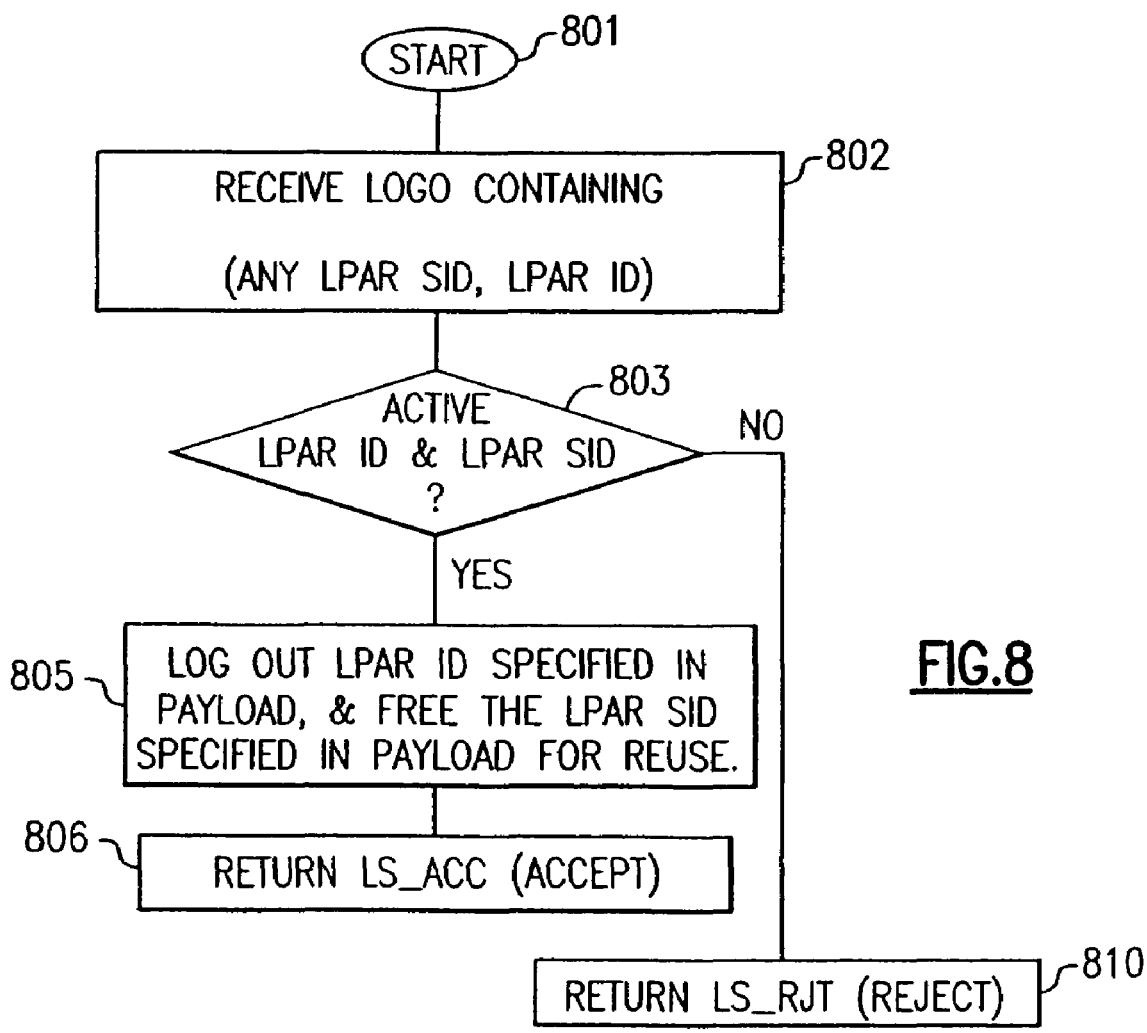

METHOD FOR NON-DISRUPTIVELY UNASSIGNING AN ACTIVE ADDRESS IN A FABRIC

CROSS REFERENCES TO RELATED APPLICATIONS

This application is a divisional application of application Ser. No. 10/043,489 filed Jan. 11, 2002 now U.S. Pat. No. 7,085,860 and assigned to the same assignee as this application.

BACKGROUND OF THE INVENTION

The present invention is related to a multipartitioned data processing system and is more particularly related to non-disruptive recovery of a single partition in a multipartitioned data processing system.

A host Fibre Channel adapter supporting multiple logical partitions (LPARs) often requires multiple Fibre Channel addresses (N_Port IDs). An example of a configuration requiring the adapter to have multiple N_Port IDs is when the adapter is shared by multiple LPARs executing the SCSI/Fibre Channel Protocol (FCP). While methods for obtaining multiple N_Port IDs have recently been developed, there is no existing method by which a specific N_Port ID may be removed. The only way to remove an N_Port ID corresponding to a given LPAR is to remove all N_Port IDs for all LPARs.

This situation is undesirable because error-recovery actions for errors relating to a given LPAR often require removal and re-initialization of the N_Port ID corresponding to that LPAR. Since the only way to reinitialize the N_Port ID corresponding to the faulted LPAR is to remove all LPAR IDs, then error-recovery actions for a given LPAR disrupt ongoing operations in all other LPARs which are sharing the adapter. A method is needed which can remove the N_Port ID of a given LPAR without affecting ongoing operations in other LPARS.

Currently, the Logout (LOGO) Extended Link Service (ELS) command is only sent to other (remote) N_Ports; it is not sent to the fabric port (F_Port). This allows a host adapter to log out with a remote N_Port (for situations such as error-recovery), but it does not allow the host adapter to log out with the fabric. In order to log out with the fabric F_Port, link-level primitive sequences are currently required. These primitive sequences not only log out the attached N_Port, but they also reinitialize the synchronization on the link. This may be acceptable for configurations in which the host adapter has only a single N_Port ID, but in cases where the adapter has multiple N_Port IDs, it results in logging out all N_Port IDs for the host adapter.

Currently, most single host adapters do not have more than one N_Port ID; therefore, there has been no need to remove one N_Port ID without affecting other N_Port IDs assigned to the adapter.

One alternative to the present invention where a single host adapter does support more than one N_Port ID is to require the adapter to de-register one of its N_Port_IDs from the fabric name-server database. This alternative would require the fabric to provide a name-server which communicates with the fabric F_Port in order to notify the fabric that the N_Port ID had been removed. Requiring the presence of a name server function in the fabric is costly and it requires communication code within the Fibre Channel.

U.S. Pat. No. 5,276,813 issued Jan. 4, 1994 to Elliott et al. for ACQUIRING ADDRESSES IN AN INPUT/OUTPUT SYSTEM, discloses a computer Input/Output system in which link-level facilities issue an acquire link address frame when initially coming on line. A dynamic switch receiving the frame then assigns a link address to the link-level facility.

U.S. Pat. No. 5,420,988 issued May 30, 1995 to Elliott for ESTABLISHING LOGICAL PATHS THROUGH A SWITCH BETWEEN CHANNEL AND CONTROL UNITS IN A COMPUTER I/O SYSTEM, discloses a mechanism for assigning multiple logical path identifications with a single physical path.

U.S. Pat. No. 6,084,859 issued Jul. 4, 2000 to Ratcliff et al. for INTERNET PROTOCOL ASSISTS USING MULTI-PATH CHANNEL PROTOCOL, discloses an apparatus for allowing any initiating host to establish communications with any receiving host in a computing network using a multi-path channel communication protocol.

SUMMARY OF THE INVENTION

In order to remove a single N_Port ID, the usage of the Logout (LOGO) Extended Link Service (ELS) is extended by allowing it to be sent to the fabric at a well-known Fibre Channel address as described below.

In the following description, an LPAR's currently-assigned "address" or "N_Port ID" is referred to as the LPAR SID. An LPAR's permanent name or "N_Port Name," is referred to here as an LPAR ID.

The process for removing a single N_Port ID (when multiple N_Port IDs have previously been assigned) is as follows:

1. The adapter sends the LOGO ELS to the well-known address for the fabric F_Port (x'FFFFFE'). The sender's N_Port ID specified in the LOGO ELS header is one of the currently-assigned LPAR SIDs. The payload of the LOGO ELS also contains an LPAR SID and corresponding N_Port Name (LPAR ID). This is the LPAR SID and LPAR ID to be logged out; there are two variations for the use of this field:

(Case a) Require that the LPAR SID and N_Port Name in the LOGO payload be those of the LPAR sending the LOGO ELS. In this case, the LPAR SID specified in the source address of the LOGO ELS header is the same as the LPAR SID specified in the LOGO ELS payload. (In this case, the sending LPAR is logging itself out.)

(Case b) Allow the LPAR SID and N_Port Name in the LOGO ELS payload to be ANY currently-assigned LPAR SID and corresponding LPAR ID. In this case, the LPAR SID specified in the source address of the LOGO ELS header may be different from the LPAR SID specified in the LOGO ELS payload. (In this case, the sending LPAR is logging out another LPAR.)

Case b is desirable if the host adapter had a "base" N_Port ID which controlled all other N_Port IDs. Case a is desirable, otherwise. Case a is also easier for the fabric to implement because the fabric can ignore the N_Port Name field in the LOGO ELS, and can simply log out the N_Port specified by the SID of the LOGO ELS)

2. Upon receipt of the LOGO ELS, the fabric removes all resources associated with LPAR SID (and corresponding LPAR ID) being logged out, and sends a link-service accept (LS_ACC) to the adapter. The destination address of the LS_ACC is set to the source address of the LOGO ELS which is the usual procedure.

If the fabric subsequently receives a request from the adapter for a new SID after it has been removed, the fabric may reassign any unused LPAR SID to the adapter, or it may reassign the same (if currently not assigned elsewhere) SID previously removed by the LOGO ELS.

BRIEF DESCRIPTION OF THE DRAWINGS

These and other objects will be apparent to one skilled in the art from the following detailed description of the invention taken in conjunction with the accompanying drawings in which:

FIG. 2 is a flowchart of the procedure followed by the N_Port of the system of FIG. 1 for requesting an N_Port address (SID) from the fabric on behalf of an LPAR ID;

FIG. 3 is a flowchart of the procedure followed by the fabric of FIG. 1 for providing addresses (SIDs) to the N_Port;

FIG. 6 is a flowchart of the procedure followed by the fabric for Case a;

FIG. 8 is a flowchart of the procedure followed by the fabric for Case b.

DESCRIPTION OF THE PREFERRED EMBODIMENT

Figure 1:
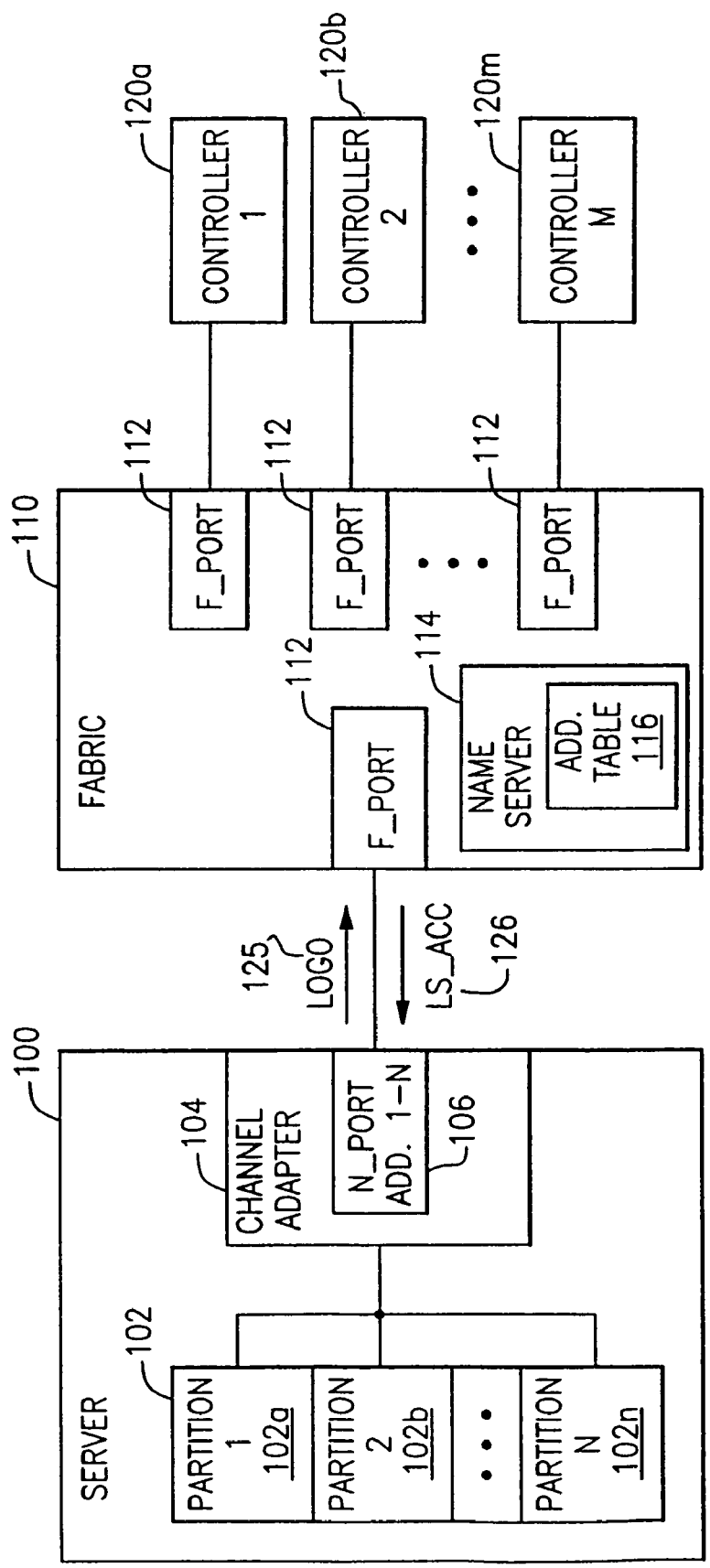
FIG. 1 is a schematic diagram of a data processing network having a server having multiple LPARs, each with an LPAR ID and at least one N_Port, the network having a network fabric.

FIG. 1 is a schematic diagram of a data processing network usable with the present invention. The data processing network includes a server or host 100 which may be, for instance, an IBM zSeries 900 server. The server 100 includes an operating system which provides for supporting multiple logical partitions (LPARs) 102a-102n. Each LPAR 102 communicates with I/O devices through channel adapters, as is well known. The server 100 is connected to a fabric 110 by a channel adapter 104, with the fabric 110 being connected to one or more controllers 120a-120m controlling I/O devices (not shown) as is well known. The connection and sending of data between the server 100, the fabric 110, and the controllers 120 may, for instance, be as described in proposed standard Fibre Channel Framing and Signaling (FC-FS Rev. 1.40) NCITS Project 1331-D, Oct. 15, 2001.

The adapter 104 is, in the exemplary embodiment, hardware having a software interface for communicating with the LPARS 102, and includes an N_Port 106 for connecting to an F_Port 112 of the fabric 110. Although a single port, the N_Port 106 recognizes multiple addresses, one address for each of the partitions 1-n (LPARs 102a-102n). Once the address for partition 102 is established, communication by, for instance, a controller to that particular partition 102 may be effected by communicating with the partition's assigned address. A name server 114 is provided in the fabric 110 which includes an address table 116. This address table includes, among other things, an identification of each partition 102 (LPAR ID), and its corresponding N_Port address (SID). Thus, in order to communicate with a partition, the name server 114 may be accessed to determine the N_Port address (SID) corresponding to that partition 102 (LPAR ID), and data is then sent to that N_Port address (SID). It will be understood that each F_Port 112 in the fabric 110 acts to receive and transmit data and commands between the fabric 110 and the channel adapter 104 or the controllers 120a-120m, as is well known.

FIG. 2 is a flow diagram of the procedure followed by the N_Port 106 of a fibre channel to obtain an N_Port address SID) from the fabric 110. The procedure starts at 200. If at 201, this is the first address for the N_Port 106, a Fabric Login extended link service (FLOGI ELS) command is issued to the fabric 110. The FLOGI ELS command includes an identification for the partition 102 requesting the address, and has a source address of all zeros to indicate to the fabric 110 that an N_Port address identifier is being requested. At 203, the address assigned by the Fabric 110 is received. The FLOGI command is sent in this embodiment on behalf of the first partition 102 requesting an address. This first request may always be assigned by a selected one of the partitions, or may be the first partition needing an address, or may be selected by, for instance, a round robin scheme, as may be desired.

This is not the first address being selected for a partition 102, at 204, a Fabric Discovery Extended Link Service (FDISC ELS) command is issued using either the source address identifier of zero, or, if known, the new source address identifier using identical service parameters as provided in the original FLOGI command. At 205, the N_Port 106 receives the address assigned or confirmed by the fabric 110 for use with the requesting partition 102.

FIG. 3 is a flow diagram of the procedure followed by the fabric 110 in assigning the address identifications requested in the flowchart of FIG. 2, and starts at 200. At 301, the fabric 110 receives the ELS command with a partition ID. The partition ID (LPAR ID) may be the worldwide partition number, or any other identification scheme to identify the partition to be associated with the N_Port address identification. At 302, it is determined if the command is a FLOGI command. If yes, at 303 an address table 116 is established in the name server 114 for the N_Port 106. At 304, the first address identification (SID) is assigned for this N_Port 106. At 305, the address identification (SID) is recorded in the table 116, along with the partition identification (LPAR ID), and other parameters needed for the communications protocol to be used to transfer commands and data between the N_Port 106 and the controllers 120a-m. At 306, the address (SID) is returned to the N_Port 106.

If the ELS is an FDISC command at 307, the next address (SID) is assigned or confirmed at 308. If a new source address identification is supplied by the FDISC ELS command, that address identification, if acceptable, is used. If an address is not supplied, the next available address is assigned by 110 in accordance with a desired scheme which insures that duplicate numbers are not assigned. In addition at 308, if the partition ID already has an address identification in the table 116, the address identification is updated by the identification in the FDISC ELS command. Thus, the FDISC ELS command may be used to request an address be assigned, may have a proposed address identification confirmed, or may update an old address identification with a new address identification. Then at 305, the partition identification, address identification, and other parameters are recorded in the address table 116, and at 306, the assigned, confirmed, or updated address identification is returned to the N_Port 106. It will now be understood that normal frame reception and transmission can begin. The controllers will see "n" different adapters, one adapter for each partition, but there will be only one channel adapter N_Port 106 with "n" different addresses.

Returning to FIG. 1, if a SID is to be removed, a LOGO command 125 is sent from the channel adapter 104 to the fabric F_Port 112 with an identification of the SID to be removed. An link-service accept (LS_ACC) 126 is sent from the fabric F_Port 112 to the adapter 104 after the designated SID has been non-disruptively removed. A SID for the removed LPAR ID can be reacquired with an FDISC, as previously described.

Figure 4:
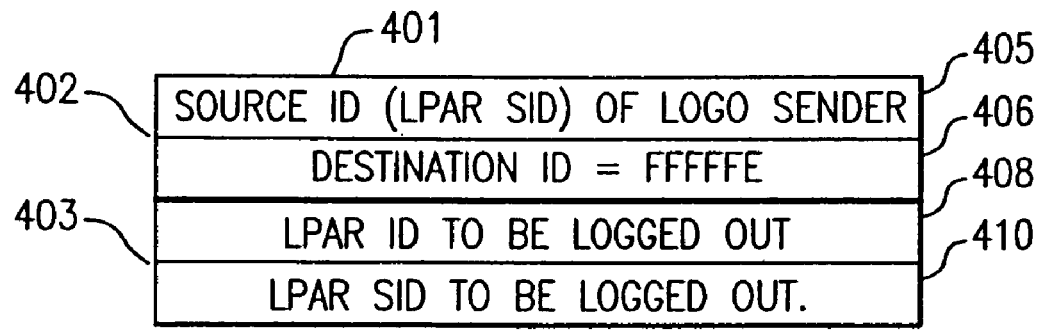
FIG. 4 is an illustration of portions of a LOGO ELS command for removing a SID, the LOGO ELS command including a header portion and a payload or data portion.

FIG. 4 is an illustration of portions of a LOGO ELS command 401 for removing a SID. The LOGO ELS command includes a header portion 402 and a payload or data portion 403. The header portion 402 includes a source ID 405 of the LOGO ELS command 401, and a destination ID of x'FFFFFE' 406, which is the address for the fabric F_Port 112. The Source ID may be the LPAR SID of the LPAR ID sending the LOGO ELS command. The payload portion of the LOGO ELS command includes the LPAR ID 408 to be logged, and the LPAR SID 410 to be logged out. It will be understood that FIG. 4 only illustrates the relevant portions of the LOGO ELS command, and that both the header 402 and payload 403 of the command 401 may include other data fields and data, as well understood in the art.

The process for removing a single SID (when multiple SIDs have previously been assigned) is as follows:

1. The adapter sends the LOGO ELS 401 to the well-known address for the fabric F_Port (x'FFFFFE') 406. The sender's N_Port ID 405 specified in the LOGO ELS header 402 is one of the currently-assigned LPAR SIDs. The payload 403 of the LOGO ELS 401 also contains an LPAR SID 410 and corresponding LPAR ID 408. This is the LPAR SID and LPAR ID to be logged out. There are two variations or cases for the use of this field:

(Case a) Require that the LPAR SID 410 and LPAR ID 408 in the LOGO payload 403 be those of the LPAR sending the LOGO ELS 401. In this case, the LPAR SID specified in the source address 405 of the LOGO ELS header 402 is the same as the LPAR SID 410 specified in the LOGO ELS payload 403. (In this case, the sending LPAR is logging itself out.)

(Case b) Allow the LPAR SID 410 and LPAR ID 408 in the LOGO ELS payload 403 to be ANY currently-assigned LPAR SID and corresponding LPAR ID. In this case, the LPAR SID specified in the source address 405 of the LOGO ELS header 402 may be different from the LPAR SID 410 specified in the LOGO ELS payload 403. (In this case, the sending LPAR is logging out another LPAR.)

Case b is desirable if the host adapter 104 had a "base" N_Port ID which controlled all other N_Port IDs. Case a is desirable, otherwise. Case a is also easier for the fabric 110 to implement because the fabric 110 can ignore the N_Port Name field 408 in the LOGO ELS 401, and can simply log out the N_Port specified by the SID 410 of the LOGO ELS 401)

2. Upon receipt of the LOGO ELS 401, the fabric removes all resources associated with LPAR SID 410 (and corresponding LPAR ID 408) being logged out, and sends a link-service accept 126 (LS_ACC) to the adapter 104. The destination address of the LS_ACC 126 is set to the source address 401 of the LOGO ELS which is the usual procedure.

If the fabric subsequently receives a request from the adapter 104 for a new SID after it has been removed, the fabric may reassign any unused LPAR SID to the adapter 104, or it may reassign the same (if currently not assigned elsewhere) SID previously removed by the LOGO ELS.

Figure 5:
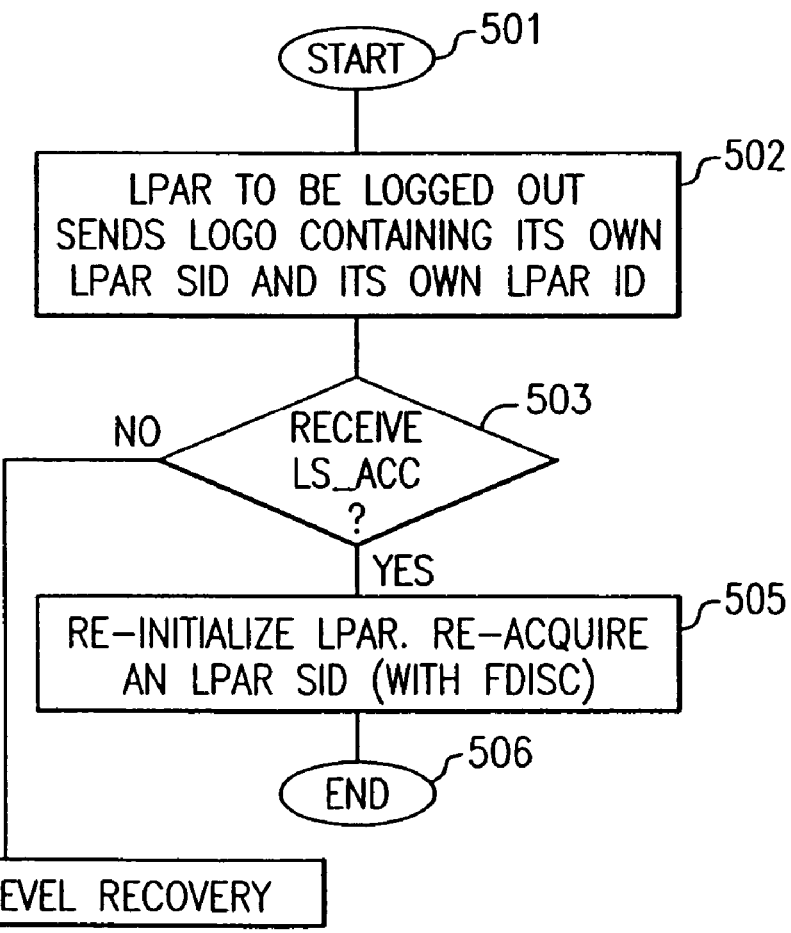
FIG. 5 is a flowchart of the procedure followed by the channel for the case in which the LOGO ELS command is on behalf of the LPAR ID and SID to be removed (Case a)

FIG. 5 is a flowchart of the procedure followed by the channel in Case a, starting at 501. At 502, the LPAR to be logged out sends a LOGO containing its own LPAR SID and its own LPAR ID in the LOGO ELS command 125 (shown at 401 of FIG. 4). A check is made at 503 to determine if an LS_ACC 126 is received at the channel adapter 104. If yes, at 505 LPAR is reinitialized. If desired, a SID may be re-acquired with an FDISC, as previously explained. The procedure ends at 506. If an LS_ACC is not received at 503, an error is detected at 508, and a low-level recovery is performed.

Figure 6:
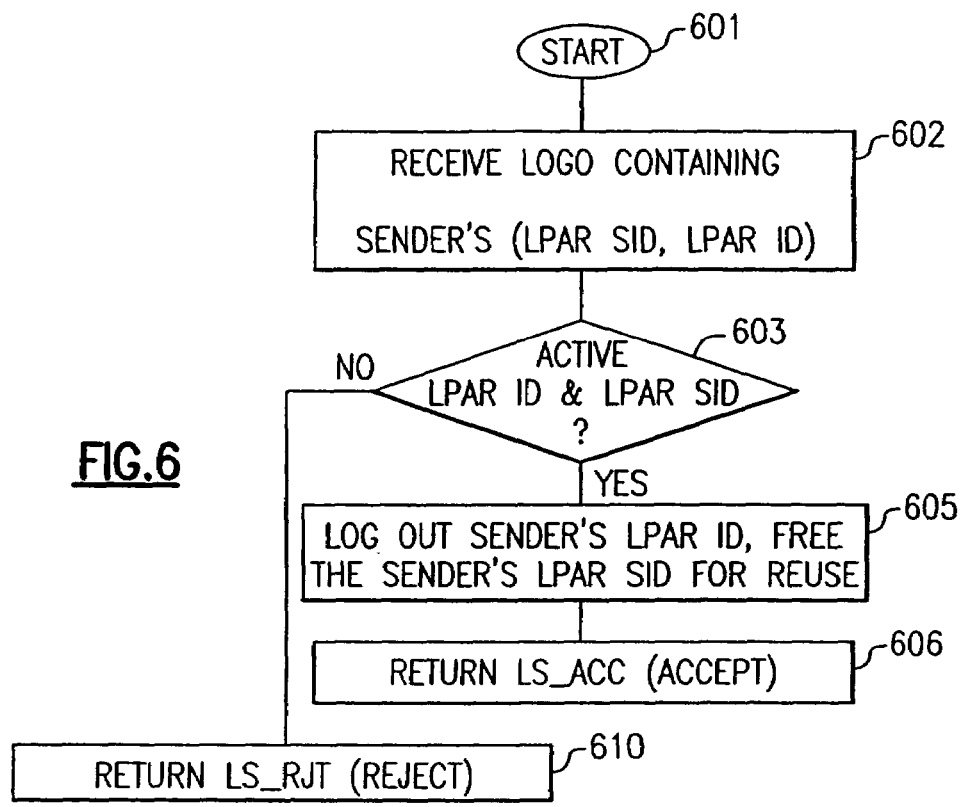

FIG. 6 is a flowchart of the procedure followed at the fabric side for Case a and starts at 601. At 602, a LOGO is received containing the senders SID and LPAR ID. A check at 603 checks the address table 116 to see if the LPAR ID and SID are active. If yes, at 605 the senders LPAR ID is logged out and the sender's SID is made available for reuse. At 606, an LS_ACC accept is sent back to the channel adapter 104. If the check at 603 is no, at 610 a Link Service Reject (LS_RJT) is returned to the channel adapter 104.

Figure 7:
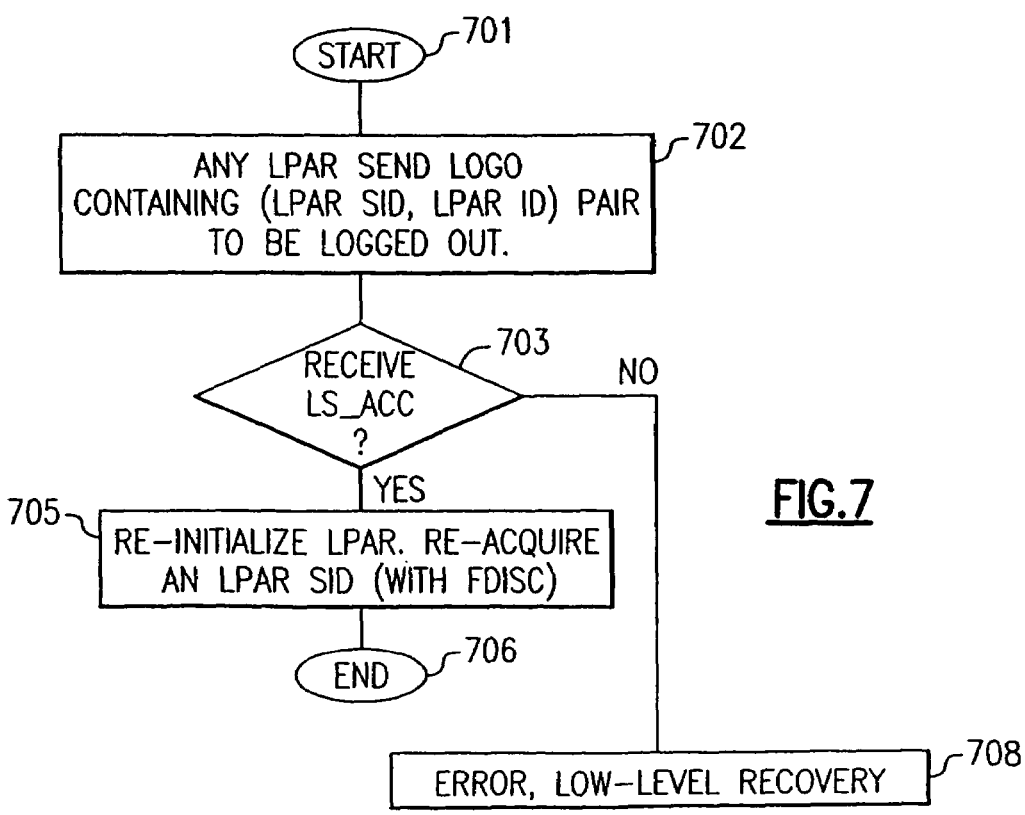
FIG. 7 is a flowchart of the procedure followed by the channel for the case in which the LPAR ID and SID to be removed is not the same as the LPAR ID and SID sending the LOGO ELS command (Case b)

FIG. 7 is a flowchart of the procedure followed by the channel in Case b, starting at 701. At 702, an LPAR wanting to log out another SID and LPAR ID sends a LOGO containing the LPAR ID and SID to be logged out (shown at 408 and 410 of FIG. 4). A check is made at 703 to determine if an LS_ACC 126 is received at the channel adapter 104. If yes, at 705 LPAR to be logged out is reinitialized. If desired, a SID may be re-acquired with an FDISC, as previously explained. The procedure ends at 706. If an LS_ACC is not received at 703, an error is detected at 708, and a low-level recovery is performed.

FIG. 8 is a flowchart of the procedure followed at the fabric side for Case b and starts at 801. At 802, a LOGO is received containing any SID and LPAR ID to be logged out. A check at 803 checks the address table 116 to see if the LPAR ID and SID are active. If yes, at 805 the LPAR ID 408 specified in the payload 403 of the LOGO ESC is logged out and the SID specified in 410 is made available for reuse. At 806, an LS_ACC accept is sent back to the channel adapter 104. If the check at 803 is no, at 810 a Link Service Reject (LS_RJT) is returned to the channel adapter 104.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for non-disruptively removing one of multiple addresses registered in a fabric, said method comprising:

receiving by the fabric from a channel adapter, a logout command requesting the fabric to remove a given address;

locating an address to be removed among the multiple addresses registered in the fabric;

changing in the fabric, a status of the address to be removed from active to removed;

sending an accept from the fabric to the channel adapter indicating the requested given address to be removed has been removed, wherein the logout command includes an identification of a partition having the given address to be removed, and the fabric includes identifications of partitions associated with the registered multiple addresses;

matching both the given address to be removed and the partition identification in the logout command to the address and associated partition identification registered in the fabric; and sending the accept from the fabric to the channel adapter only if both the given address and partition identification in the logout command match the address and associated partition identification registered in the fabric.

2. The method of claim 1 wherein the logout command includes a source address of the partition which is making the request, and the given address to be removed is the source address.

* * * * *